United States Patent [19]

Scalise

[11] 3,838,606

[45] Oct. 1, 1974

[54] MOTORCYCLE CHAIN TENSIONER
[75] Inventor: Joseph F. Scalise, North Syracuse, N.Y.
[73] Assignee: Filter Tech, Inc., Manlius, N.Y.
[22] Filed: Aug. 21, 1973
[21] Appl. No.: 390,296

[52] U.S. Cl. .................................. 74/242.11 S
[51] Int. Cl. ............................................. F16h 7/12
[58] Field of Search .............. 74/242.11 S, 242.15 R

[56] References Cited
UNITED STATES PATENTS
1,988,421  1/1935  McCann et al. ............... 74/242.11 S
3,673,884  7/1972  Southiere ..................... 74/242.15 R

*Primary Examiner*—Leonard H. Gerin
*Attorney, Agent, or Firm*—Charles S. McGuire

[57] ABSTRACT

Apparatus for maintaining a continuous loop drive chain of a motorcycle or similar vehicle in a taut condition. An arm is pivoted at one end to the motorcycle frame and carries a guide block at the other end. The arm is spring biased to urge the block against the chain intermediate of the two chain sprockets to maintain the chain loop taut. The chain rollers ride on a raised lip on the block having an arcuate surface in the direction of chain travel. Unique adjustment and mounting means are provided to insure that the chain contacts a maximum surface area of the block, and to allow the latter to be rotated and used on both sides.

6 Claims, 5 Drawing Figures

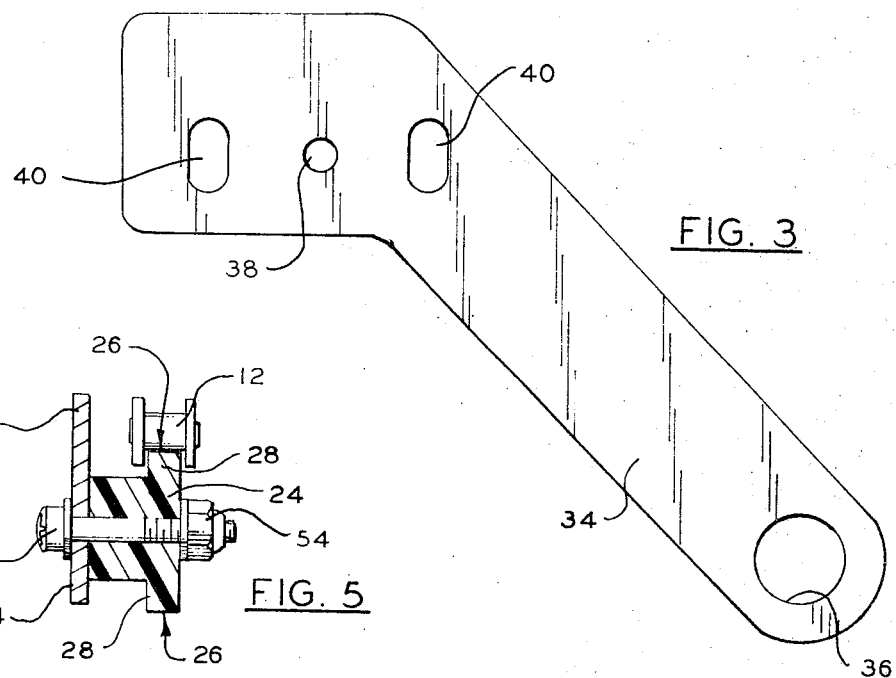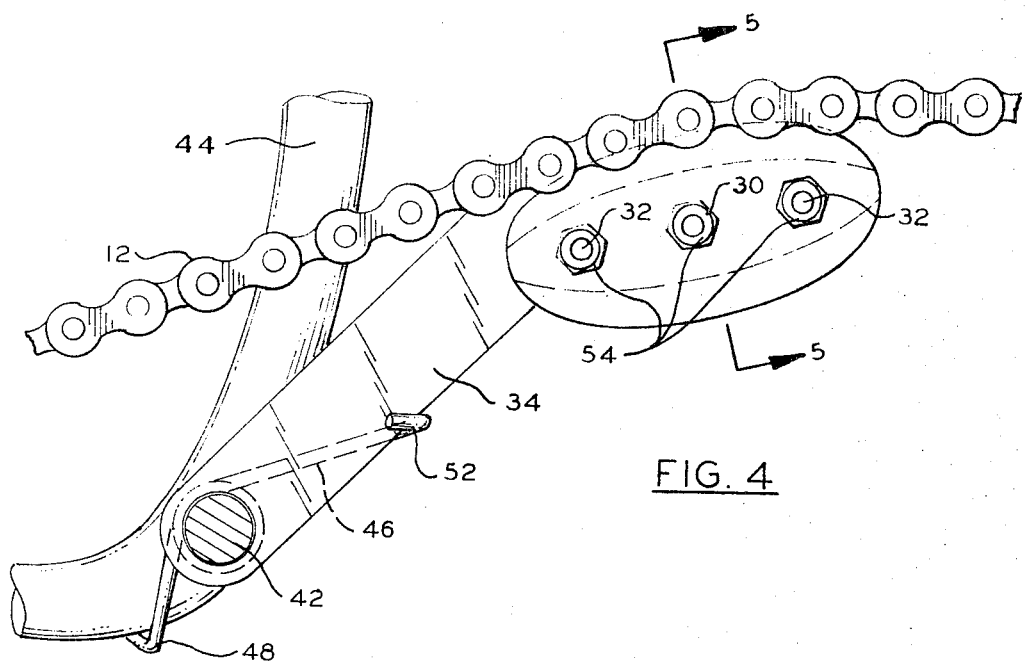

MOTORCYCLE CHAIN TENSIONER

BACKGROUND OF THE INVENTION

The present invention relates to apparatus for maintaining a continuous loop of chain in a taut condition and, more particularly, to a novel chain tensioner for a motorcycle, or the like.

Drive chains for motorcycles, as well as in other applications, are provided in a continuous loop trained about two sprockets, one the drive sprocket on the engine output shaft, the other the driven sprocket on a wheel. The chain tends to become loose after a certain amount of operation due to stretching, and similar causes. Besides increasing the possibility of the chain coming off one or both sprockets, the chain is more susceptible to wear and breakage when operated in a loose condition. Furthermore, throttle response of the vehicle is poor and the sprockets may become hooked with a loose chain. It is therefore desirable to provide some means for insuring that the chain will remain in a taut condition, even as it stretches during use.

It is a principal object of the present invention to provide novel apparatus for maintaining a continuous loop drive chain in a taut condition during use, including means for mounting a chain guide block to provide optimum operating life of the block.

A further object is to provide a motorcycle chain tensioning device which may be easily and quickly adjusted to fit in an optimum operating position on a variety of cycles having chains of different lengths, widths and pitch.

Another object is to provide a pivoted arm chain tensioner wherein the chain guide block may be used in either of two positions, to double the operating life of the block, and in both positions the block cooperates with the arm upon which it is mounted to constrain lateral movement of the chain.

Other objects and advantages of the invention will in part be obvious and will in part appear hereinafter.

BRIEF SUMMARY

In the preferred embodiment, an arm is pivotally mounted at one end on a fixed portion of a motorcycle at a position adjacent to a point on the drive chain intermediate of the engine sprocket and the wheel sprocket about which the continuous loop chain passes. The arm carries, on the end opposite its pivotal mounting, a guide block which is biased into engagement with the chain by a spring. The block is mounted on the arm by three machine screws which extend through cooperatively positioned openings in the pivot arm and guide block. The center opening in the pivot arm is circular, and the outer two elongated, whereby the block may be pivotally moved about the center screw and its position fixed with respect to the arm by tightening nuts on each of the machine screws.

The guide block is symmetrically formed about the center so that it may be rotated 180° and present an identical opposite surface for contacting the chain. A pair of raised lips are formed on the side of the block spaced from the pivot arm, each lip having an identical, arcuate surface which is curved in the direction of chain travel so that a maximum length of the chain contacts the lip surface on which the chain rollers ride.

DESCRIPTION OF THE DRAWINGS

FIG. 3 is an elevational view of the pivot arm element;

FIG. 4 is a fragmentary, elevational view of the device as mounted and in use; and FIG. 5 is a sectional view taken on the line 5—5 of FIG. 4.

DETAILED DESCRIPTION

Figure 1:
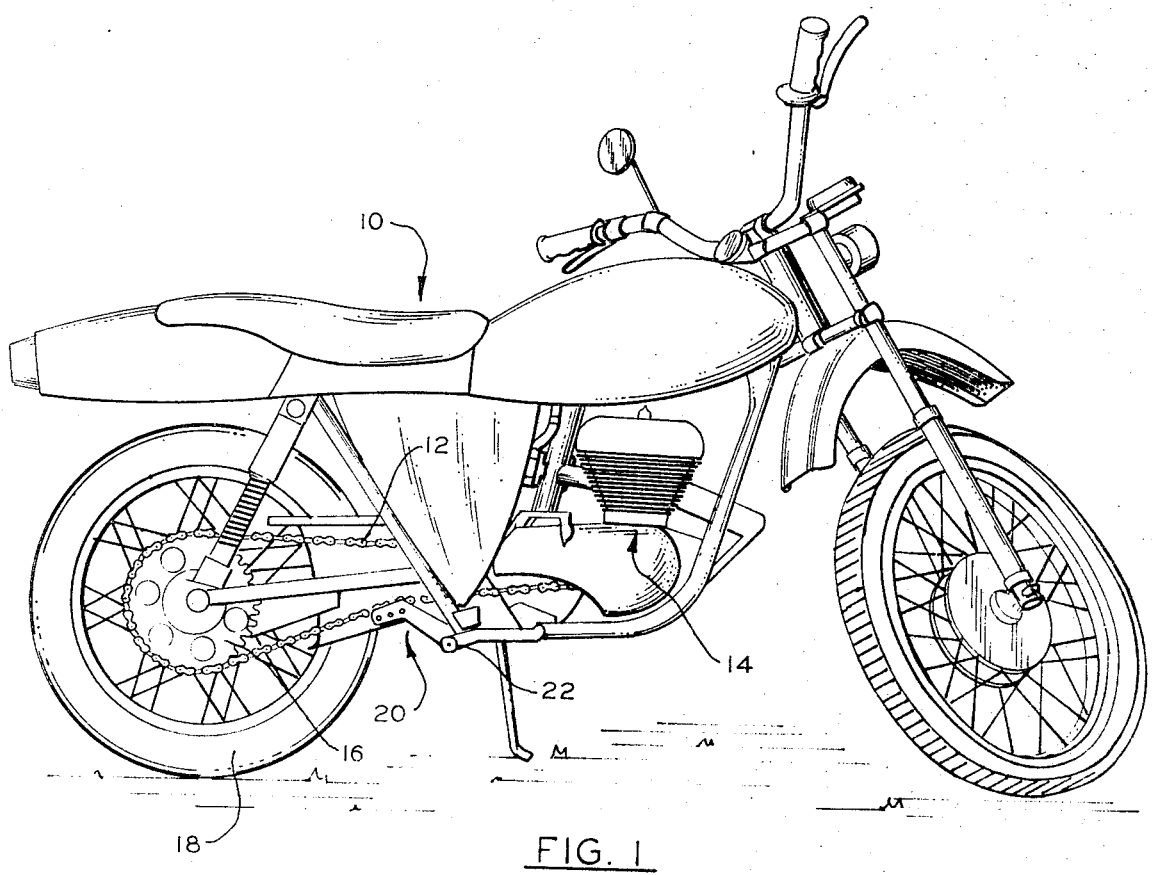
FIG. 1 is a side view of a motorcycle on which the chain tensioner of the present invention is mounted.

In FIG. 1 is shown a typical motorcycle 10 having a continuous loop chain 12 trained about a pair of sprockets, one on the output shaft of the motorcycle engine, designated generally by a reference numeral 14, and the other sprocket 16 being attached to rear wheel 18 of cycle 10. The device 20 for maintaining chain 12 in a taut condition is pivotally mounted at 22, preferably on an existing portion of the cycle frame, such as the passenger foot peg mounting stud, brake shaft, etc. Device 20 is biased by a suitable spring, as described more fully hereinafter, toward rotation in a clockwise direction as shown in FIG. 1. Thus, the end of device 20 opposite pivotal mounting 22 is urged upwardly into engagement with the lower reach of chain 12 at a point intermediate of the two sprockets.

Figure 2:
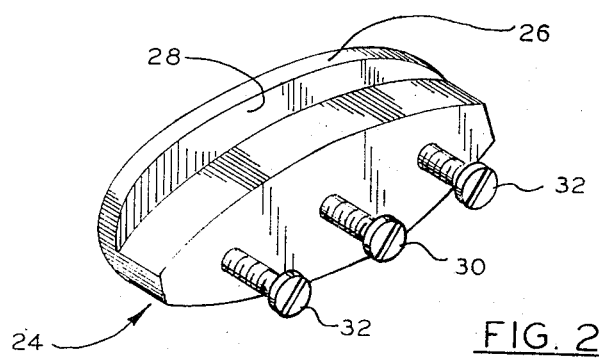
FIG. 2 is a perspective view of the guide block element of the apparatus.

Referring now to FIGS. 2 and 3, the two basic elements of device 20 are shown in detail. Guide block 24 is symmetrically formed on the upper and lower sides of its horizontal axis to provide two arcuate wear surfaces 26, on raised lips 28, one of which is seen in FIG. 2. Guide block 24 is provided with three openings for mounting screws. The central opening is formed on the aforementioned horizontal axis of the block, the screw passing through this opening being numbered 30, the screws passing through the outer openings, equally spaced from the central opening, being numbered 32.

Pivot arm 34 includes a circular opening 36 at one end for mounting the arm on the fixed pivot, preferably utilizing a bushing (not shown). The end of the arm opposite the pivotal mounting thereof includes circular opening 38 and two vertically elongated outer openings 40.

As shown in FIG. 4, arm 34 is mounted on a fixed peg, brake shaft, or the like, 42 extending from frame 44 of motorcycle 10. Spring 46 passes around shaft 42 (or the bushing thereon) with one end retained under frame 44 and the other end 52 engaging arm 34. The biasing force of spring 46 thereby urges the arm in a counter-clockwise direction, the device being shown in FIG. 4 from the side opposite that shown in FIG. 1.

Block 24 is mounted on arm 34 with screw 30 passing through central, circular opening 38, of slightly larger diameter than the screw, and outer screws 32 passing through outer, elongated openings 40. The block is secured by nuts 54, secured on screws 30 and 32 on the opposite side of arm 34. Thus, the rotational position of block 24 about its central axis may be adjusted by loosening nuts 54, rotating the block in the desired direction with screws 32 moving in elongated openings 40, and re-tightening the nuts. In this manner, block 24 may be adjusted to provide the maximum contact between chain 12 and surface 26.

Chain 12 is of conventional construction being formed of a succession of spaced rollers joined together by outer links. As clearly seen in FIG. 5, the rollers of chain 12 ride on upper wear surface 26, with the chain links extending on each side of lip 28 to restrain lateral movement of the chain. As also seen in FIG. 5, upper edge portion 56 of arm 34 extends to at least the vertical position of the top of chain 12. Thus, should the chain come off lip 28 on that side it will be restrained from moving laterally off of block 24 by arm portion 56.

As previously mentioned, block 24 is formed with an identical lip 28, having wear surface 26, on each side of its central axis. Both of the lips are seen in FIGS. 4 and 5. By removing screws 32, block 24 may be rotated 180° about screw 30 to place the opposite wear surface in position for contact by chain 12. Screws 32 are then replaced, nuts 54 replaced and tightened and the action of unit 20 is the same.

This has the effect of doubling the life of block 24 and the block is adjustable about its central axis in the same manner in either position to achieve maximum chain contact. The block may therefore be used with equal advantage in motorcycles having chains of different length, pitch or width. Also, maximum chain contact with the block may be achieved as the chain stretches. Block 24 is preferably constructed of cast urethane (80–90 Durometer), or materials having similarly advantageous friction and wear characteristics.

Thus, there has been disclosed a chain tensioning device, particularly suitable for incorporation with a motorcycle. The guide block is adjustable relative to the pivoted arm upon which it is mounted to provide maximum contact between the chain and block, thereby increasing the life of the wearing surface of the block. Furthermore, the block is reversible to present a new surface for contact by the chain, thereby doubling the life. Finally, in either position of the block, the chain is prevented from moving laterally off the guide block in the direction of the rider's leg by an upwardly extending edge portion of the pivoted arm.

What is claimed is:

1. A tensioning device for a continuous loop chain engaging at least two sprockets, said device comprising, in combination:

a. a pivotally mounted arm;
    b. a block attached to said arm at a point remote from the pivotal mounting thereof and adjacent a point on the chain intermediate of the sprockets;
    c. a pair of identically shaped, raised lips extending from opposite sides of said block and spaced from the attachment thereof to said arm;
    d. each of said lips having an arcuate surface one of which is contacted by the chain;
    e. mounting means for attaching said block and arm to allow rotational movement of said block relative to said arm for a limited distance about an axis through said block and parallel to the pivot axis of said arm;
    f. said block and arm being so constructed and arranged relative to said mounting means that the position of said block may be reversed to selectively arrange either of said arcuate surfaces for contact by the chain; and
    g. a spring urging said arm toward rotation about its pivotal mounting in a direction urging one of said arcuate surfaces into engagement with the chain.

2. The invention according to claim 1 wherein said arm includes an upwardly extending edge portion horizontally adjacent, and spaced from the arcuate surface contacted by the chain to restrain lateral movement thereof in the event the chain comes off the arcuate surface.

3. The invention according to claim 1 wherein the radius of curvature of said arcuate surfaces is substantially equal to that of the chain when tensioned between the sprockets.

4. The invention according to claim 1 wherein said mounting means comprises cooperative screws and openings associated with said arm and block.

5. The invention according to claim 4 wherein a row of three of said screws and openings are provided, the opening in said arm for the center screws being elongated to permit rotational adjustment of said block about said center screw.

6. The invention according to claim 5 wherein said center screw is arranged on the central, lateral axis of said block.

* * * * *